United States Patent
Renaud et al.

(10) Patent No.: US 7,156,282 B1
(45) Date of Patent: Jan. 2, 2007

(54) TITANIUM-ALUMINIDE TURBINE WHEEL AND SHAFT ASSEMBLY, AND METHOD FOR MAKING SAME

(75) Inventors: Phillipe Renaud, Sanchey (FR); Marc Wilson, Thaon les Voges (FR)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 11/247,557

(22) Filed: Oct. 11, 2005

(51) Int. Cl.
*B23K 31/02* (2006.01)

(52) U.S. Cl. .................................. 228/122.1; 428/660

(58) Field of Classification Search ............ 228/122.1, 228/120, 121, 262.1, 262.4, 262.43, 262.41, 228/262.5, 262.42, 262.7, 262.71, 262.72; 29/889, 889.2, 889.21; 416/213 A, 213 R; 428/660, 682
See application file for complete search history.

(56) References Cited

U.S. PATENT DOCUMENTS

| | | | | |
|---|---|---|---|---|
| 4,798,320 A | * | 1/1989 | Fang | 228/124.7 |
| 5,064,112 A | * | 11/1991 | Isobe et al. | 228/112.1 |
| 5,073,085 A | * | 12/1991 | Ito et al. | 415/216.1 |
| 5,196,162 A | * | 3/1993 | Maki et al. | 420/418 |
| 5,318,214 A | | 6/1994 | Lucas, Jr. et al. | |
| 5,431,752 A | * | 7/1995 | Brogle et al. | 148/516 |
| 6,007,301 A | * | 12/1999 | Noda et al. | 416/213 R |
| 6,131,797 A | * | 10/2000 | Gasdaska et al. | 228/122.1 |
| 6,291,086 B1 | * | 9/2001 | Nguyen-Dinh | 428/660 |

FOREIGN PATENT DOCUMENTS

| | | |
|---|---|---|
| EP | 0816007 | 7/1998 |
| EP | 1507062 | 4/2004 |
| EP | 1507063 | 7/2004 |

* cited by examiner

*Primary Examiner*—Kevin Kerns
*Assistant Examiner*—Michael Aboagye
(74) *Attorney, Agent, or Firm*—Chris James; Don Hill

(57) ABSTRACT

A titanium-aluminide turbine wheel (120, 220, 320, 420) is joined to the end of a shaft (110, 210, 310, 410) by utilizing a titanium surface on the end of the shaft to be joined to the wheel, and electron-beam welding the wheel onto the titanium surface on the shaft. A steel shaft (110, 310, 410) can have a titanium-containing end piece (130, 330, 430) mechanically joined (by brazing, bonding, or welding) to the end of the shaft, and the end piece can be directly electron-beam welded to the wheel. Alternatively, the shaft (210) can be formed as a titanium member and the end (212) of the shaft can be directly electron-beam welded to the wheel (220). In another embodiment, a ferrous end piece (330) is mechanically joined to the titanium-aluminide turbine wheel (320) and then the end piece is directly electron-beam welded to the end of a steel shaft (310). Alternatively, a silver-titanium alloy member (430) is sandwiched between the wheel (420) and a steel shaft (410) and is melted to join the parts together.

6 Claims, 2 Drawing Sheets

TITANIUM-ALUMINIDE TURBINE WHEEL AND SHAFT ASSEMBLY, AND METHOD FOR MAKING SAME

BACKGROUND OF THE INVENTION

The present invention relates to turbomachinery in general, and to turbochargers in particular. More specifically, the invention relates to a shaft assembly comprising a shaft joined to a titanium-aluminide turbine wheel, and to methods for making such a shaft assembly.

Aluminides are intermetallic compounds. Aluminide-based alloys are attractive for various applications because they combine superior high-temperature performance with low specific gravity. In particular, titanium aluminide alloys are of current interest for manufacturing turbine wheels for turbomachinery such as turbochargers. The gamma-phase titanium-aluminide alloys appear to be especially useful.

There are two basic forms of titanium-aluminide: $Ti_3Al$ alpha-2 phase containing between 22% and 39% aluminum, and TiAl gamma phase containing between 49% and 66% aluminum. There is also an orthorhombic form containing between 12.5% and 30% niobium, generally denoted as $Ti_2AlNb$ (O)-phase. In terms of material properties, $Ti_3Al$ alpha-2 phase has good high-temperature strength but poor oxidation and creep resistance. The alpha-2 phase is also extremely brittle and as such is difficult to weld effectively. The gamma phase has about one-third lower high-temperature strength than the alpha-2 phase but greater oxidation and creep resistance. The gamma phase is also less brittle and thus easier to weld. Even with the gamma phase, however, direct fusion-welding (e.g., by electron beam welding) of steel to titanium-aluminide is difficult to achieve without forming cracks in the weld zone.

Research in published literature has shown that solid-state cracking tends to occur in the weld zone as a result of high thermal stress and intrinsic brittleness of the welded microstructure. Some success in producing crack-free welds has been achieved by carefully controlling the welding parameters, notably the welding speed and cooling gradient, so as to reduce stress and the formation of brittle phases within the structure. Pre-heat and post-heat vacuum treatments have also been helpful in reducing or preventing cracking. It has been observed that solid-state cracking can be prevented by keeping the cooling rate below 300° C. per second and/or by reducing the intensity of the electron beam and keeping the weld speed below 10 mm per second. In practice, however, it can be difficult to control these welding parameters as accurately as would be necessary to ensure crack-free welds. Furthermore, even if crack-free welds are produced, there is still the possibility of post-weld cracking to occur when the welded component is introduced to an ambient atmosphere. It has been suggested that oxygen and hydrogen can be responsible for post-weld cracking.

In the production of turbochargers, the turbine wheel is generally welded to a steel shaft. Welding of titanium-aluminide to a different material such as steel further increases the difficulty of producing satisfactory welds because of the potential for uncontrolled creation of various intermediate materials in the weld zone. Thus, there is a need for a method for joining a titanium-aluminide turbine wheel to a shaft that avoids the above-noted difficulties.

Friction welding utilizes a rotary force to join a shaft blank to an as-cast wheel through a pipe-to-pipe joint. The resulting weld zone is brittle and requires a localized post-weld temper treatment to prevent fracture during machining of the finished component. The principal advantage of the electron beam welding process over friction welding is the ability to produce a parallel fusion zone with minimum heat input, which in turn reduces distortion and allows the welding of machine-finished components.

The development of electron beam welding and other high-energy density processes with rapid solidification characteristics has increased the commercial potential of welding dissimilar materials and resulted in novel and modified structures. Simultaneously, progress has been offset by problems within the fusion zone, boundaries, and heat-affected zones of both parent materials because of to phase transformations and cracking phenomenon.

BRIEF SUMMARY OF THE INVENTION

In one aspect of the invention, a titanium-containing end piece is mechanically joined (e.g., brazed, welded, or friction plunged) to the end of the steel shaft. The resulting assembly is then directly electron-beam welded to the titanium-aluminide wheel. The end piece can comprise a substantially pure titanium member.

In a second embodiment, the shaft can be formed as a titanium member (e.g., milled from titanium bar stock) and the end of the shaft can be directly welded to the wheel. Welding can be accomplished by electron beam.

In another embodiment, a ferrous end piece (e.g., A286, HY-130, or HP9-4-20) is mechanically joined (brazed, bonded, or welded) to the titanium-aluminide turbine wheel and the end piece is then directly welded to the end of a steel shaft.

In a further embodiment of the invention, a titanium alloy member, such as a silver-titanium alloy member, is sandwiched between the wheel and a steel shaft and is brazed between the parts to join the parts together. The titanium alloy member preferably has a melting point of 650° C. to 750° C., i.e., low enough so that melting of the alloy member does not risk melting of the wheel or shaft, but high enough to prevent melting of the alloy member during service of the shaft-wheel assembly in a turbocharger. The alloy member can be brazed by electron beam.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present inventions now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

As used herein, the term "brazing" denotes a group of joining processes in which coalescence is produced by heating to a suitable temperature above 450° C. (840° F.) and by using a ferrous or nonferrous filler metal that must have a liquidus temperature above 450° C. (840° F.) and below the solidus temperature(s) of the base metal(s). The filler metal is distributed between the closely fitted surfaces of the joint. Brazing is distinguished from soldering in that soldering employs a filler metal having a liquidus temp below 450° C. (840° F.). Brazing proceeds through four distinct steps: (1) the assembly or the region of the parts to be joined is heated to a temperature of at least 450° C. (840° F.); (2) the assembled parts and brazing filler metal reach a temperature high enough to melt the filler metal but not the parts; (3) the molten filler metal, held in the joint by surface tension, spreads into the joint and wets the base metal surfaces; and (4) the parts are cooled to solidify the filler metal, which is held in the joint by capillary attraction and anchors the parts together by metallurgical reaction and atomic bonding.

Figure 1:
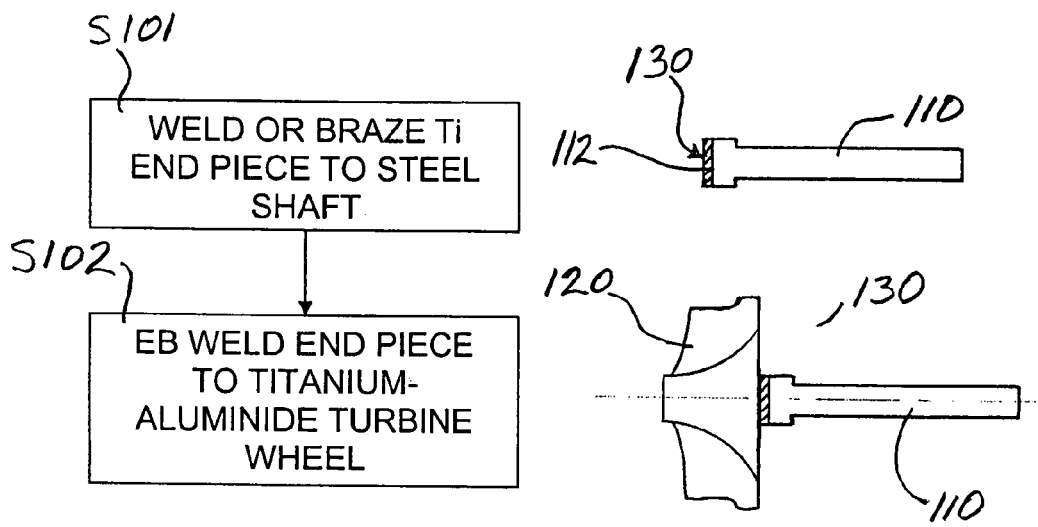
FIG. 1 is a diagrammatic depiction of a method for assembling a shaft assembly in accordance with a first embodiment of the invention.

With reference to FIG. 1, a first embodiment of the invention is illustrated. A steel shaft 110 is provided for joining with a titanium-aluminide turbine wheel 120. The shaft 110 can comprise a medium-carbon low alloy steel. The shaft has a joint surface 112 at its end for attachment to the turbine wheel. The turbine wheel can be formed of any of various titanium-aluminide intermetallic compounds.

In accordance with the first embodiment of the invention, an end piece 130 is provided as an intermediary between the steel shaft 110 and the titanium-aluminide turbine wheel 120. The end piece 130 is a titanium-containing member, and advantageously can comprise a substantially pure form of titanium or a titanium alloy. The end piece can be of various configurations such as in the form of a ring, a disk, or a slab. In a first step S101, the end-piece 130 is mechanically joined (brazed, bonded, or welded) to the shaft at the joint surface 112 and thus becomes a part of the shaft. The result of the first step is that the end of the shaft 110 presents a surface, defined by the end piece 130, that is titanium-containing (either substantially pure titanium or titanium in alloy form).

In a second step S102, the end piece 130 is welded or brazed to the titanium-aluminide turbine wheel 120. This can be accomplished by electron beam welding. The wheel is thus joined to the shaft to form a shaft assembly.

Figure 2:
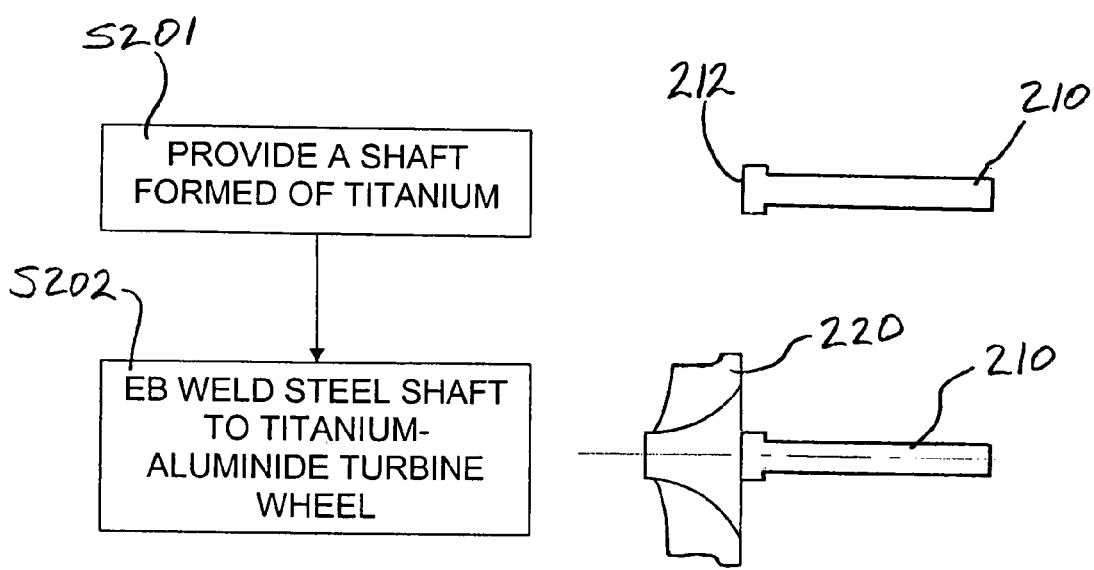
FIG. 2 is a diagrammatic depiction of a method for assembling a shaft assembly in accordance with a second embodiment of the invention.

FIG. 2 illustrates a second embodiment of the invention. A shaft 210 formed of titanium or titanium alloy is provided in a first step S201. For example, the shaft can be milled from titanium bar stock or titanium alloy bar stock. The shaft has a joint surface 212 for attachment to a turbine wheel. In a second step S202, a titanium-aluminide turbine wheel 220 is welded to the joint surface 212 of the shaft 210, such as by electron beam welding. The wheel is thus joined to the shaft to form a shaft assembly.

Figure 3:
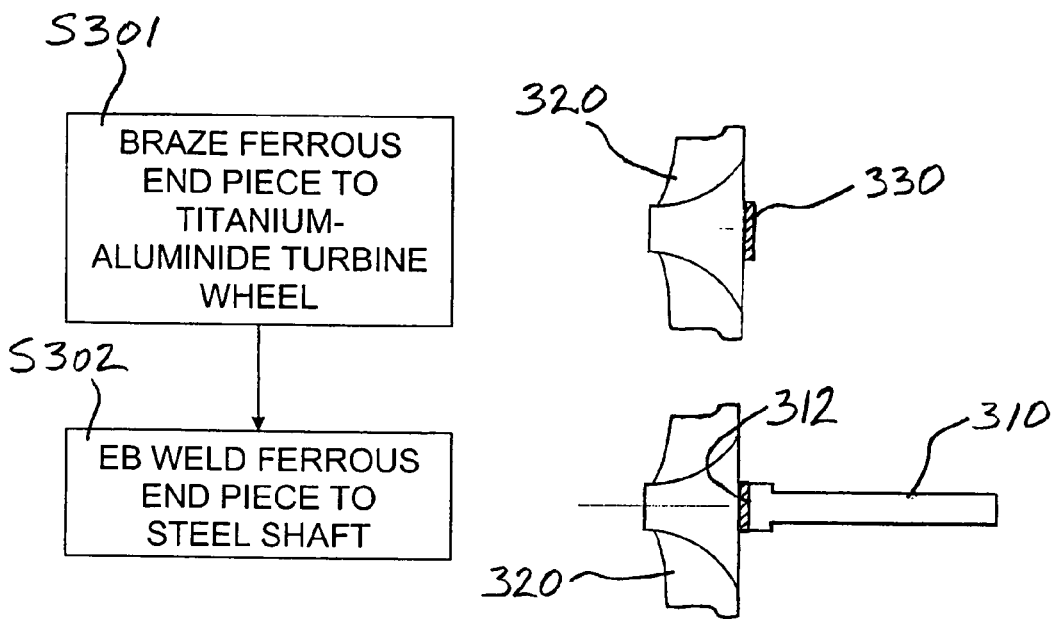
FIG. 3 is a diagrammatic depiction of a method for assembling a shaft assembly in accordance with a third embodiment of the invention.

A third embodiment of the invention is depicted in FIG. 3. In a first step S301, a ferrous end piece 330 is brazed to a titanium-aluminide turbine wheel 320. The end piece can comprise various ferrous-based materials, including but not limited to A286, HY-130, or HP9-4-20. In a second step S302, the ferrous end piece 330 is mechanically joined (brazed, bonded, or welded) at a joint surface 312 to a steel shaft 310. The shaft can be formed of various steel compositions. A suitable steel is a medium-carbon low alloy steel.

The end piece 330 can be welded to the shaft 310 by electron beam welding. The wheel is thus joined to the shaft to form a shaft assembly.

Figure 4:
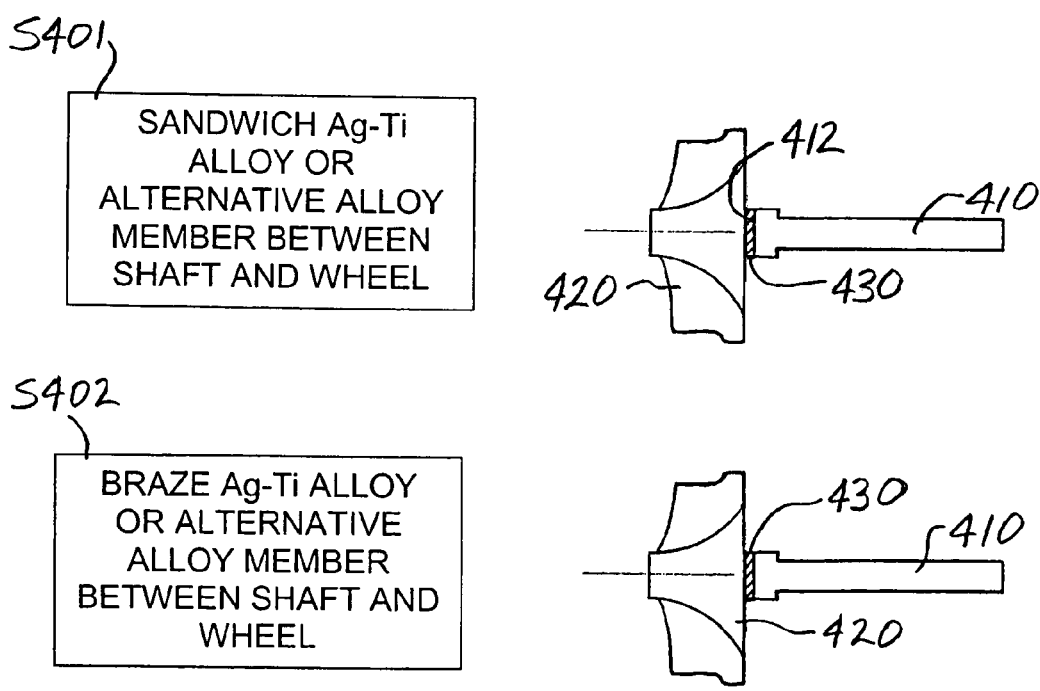
FIG. 4 is a diagrammatic depiction of a method for assembling a shaft assembly in accordance with a fourth embodiment of the invention.

FIG. 4 shows a fourth embodiment of the invention. In a first step S401 of the process, the alloy member 430 is sandwiched between the facing surfaces of the wheel 420 and shaft 410. In a second step S402, the alloy member is brazed between the shaft and wheel, such as by irradiating the member with an electron beam, to at least partially melt the member so that the plasticized material of the alloy member wets the facing surfaces of the parts to be joined. The plasticized material is then allowed to cool and solidify, thereby joining the wheel to the shaft to form a shaft assembly. The member 430 can be ring-shaped. The alloy member 430 can comprise various alloys. As one non-limiting example, the alloy member can be formed of a silver-titanium alloy, or an alternative titanium alloy. The material of which the alloy member is made must have a melting point that is low enough so that melting of the alloy member can be accomplished without any melting of either the turbine wheel or the shaft. Additionally, the melting point of the alloy member must be high enough so that there is no risk of the alloy member melting during subsequent service of the shaft assembly in a turbocharger. Advantageously, the melting point of the alloy member is between 650° C. and 750° C.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for assembling a shaft assembly of a turbocharger, comprising the steps of:
   providing a titanium-aluminide turbine wheel (120);
   providing a steel shaft (110) having opposite first and second ends, the shaft having a joint surface (112) at the first end for attachment to the turbine wheel;
   providing an end piece (130), the end piece having opposite surfaces and consisting of substantially pure titanium;
   mechanically joining the end piece (130) to the first end of the steel shaft by bonding, welding or brazing one of the opposite surfaces of the end piece to the joint surface (112) of the shaft; and
   welding the other of the opposite surfaces of the end piece (130) to a surface of the titanium-aluminide turbine wheel (120).

2. The method of claim 1, wherein the end piece (130) is provided as a ring-shaped member.

3. The method of claim 1, wherein the welding step comprises electron-beam welding the end piece (130) to the titanium-aluminide turbine wheel (120).

4. The method of claim 1, wherein the shaft (110) is provided as a low alloy steel member.

5. A shaft assembly comprising:
   a titanium-aluminide turbine wheel (120);
   a steel shaft (110) having opposite first and second ends, the shaft having a joint surface (112) at the first end for attachment to the turbine wheel; and an end piece (130) having opposite surfaces and consisting of substantially pure titanium;

one of the opposite surfaces of the end piece (130) being mechanically joined to the first end of the steel shaft (110) by bonding, welding or brazing to the joint surface (112) of the shaft, and the other of the opposite surfaces of the end piece being welded to a surface of the titanium-aluminide turbine wheel (120).

6. The shaft assembly of claim 5, wherein the end piece (130) comprises a ring, disk, or slab-shaped member.

* * * * *